United States Patent
Yasuma

(10) Patent No.: US 9,661,000 B2
(45) Date of Patent: May 23, 2017

(54) COMMUNICATION APPARATUS, COMMUNICATION SYSTEM, METHOD OF CONTROLLING COMMUNICATION APPARATUS, AND STORAGE MEDIUM

(71) Applicant: CANON KABUSHIKI KAISHA, Tokyo (JP)

(72) Inventor: Kensuke Yasuma, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 14/613,466

(22) Filed: Feb. 4, 2015

(65) Prior Publication Data
US 2015/0229627 A1    Aug. 13, 2015

(30) Foreign Application Priority Data
Feb. 12, 2014   (JP) .................................. 2014-024731

(51) Int. Cl.
*H04L 29/06* (2006.01)
*H04L 29/08* (2006.01)

(52) U.S. Cl.
CPC ............ *H04L 63/104* (2013.01); *H04L 63/08* (2013.01); *H04L 63/102* (2013.01); *H04L 67/10* (2013.01); *H04L 67/12* (2013.01)

(58) Field of Classification Search
CPC ..... H04L 63/08; H04L 63/102; H04L 63/104; H04L 67/10; H04L 67/12
See application file for complete search history.

(56) References Cited

U.S. PATENT DOCUMENTS

| | | | | |
|---|---|---|---|---|
| 7,343,301 | B1* | 3/2008 | Nash ..................... | G06Q 10/00 705/1.1 |
| 2002/0144149 | A1* | 10/2002 | Hanna .................. | H04L 9/3263 726/5 |
| 2006/0136999 | A1* | 6/2006 | Kreyscher ........... | G06F 21/6218 726/6 |
| 2007/0198214 | A1* | 8/2007 | Bade ..................... | G06F 21/577 702/182 |
| 2011/0191237 | A1* | 8/2011 | Faith .................... | G06F 1/1694 705/39 |
| 2011/0225426 | A1* | 9/2011 | Agarwal ................ | H04L 63/10 713/175 |
| 2012/0324559 | A1* | 12/2012 | Ran ........................ | G06F 21/36 726/9 |

(Continued)

FOREIGN PATENT DOCUMENTS

| | | |
|---|---|---|
| JP | 2010-502109 A | 1/2010 |
| WO | 2008/024454 A1 | 2/2008 |

*Primary Examiner* — Robert Leung
(74) *Attorney, Agent, or Firm* — Carter, DeLuca, Farrell & Schmidt, LLP

(57) ABSTRACT

A communication apparatus comprises an obtainment unit configured to obtain authentication information from each of a first other communication apparatus and a second other communication apparatus; an authentication unit configured to, based on the authentication information obtained by the obtainment unit, perform authentication processing; and a provision unit configured to provide, based on a result of the authentication processing, information of a third other communication apparatus associated with the first other communication apparatus to a fourth other communication apparatus associated with the second other communication apparatus.

19 Claims, 11 Drawing Sheets

(56) References Cited

U.S. PATENT DOCUMENTS

| | | | | |
|---|---|---|---|---|
| 2014/0123237 A1* | 5/2014 | Gaudet | ................ | H04L 63/101 |
| | | | | 726/4 |
| 2014/0165165 A1* | 6/2014 | Story, Jr. | ............... | H04W 12/04 |
| | | | | 726/6 |
| 2014/0289824 A1* | 9/2014 | Chan | ........................ | G06F 9/54 |
| | | | | 726/5 |
| 2015/0127939 A1* | 5/2015 | Mazandarany | ........... | H04L 9/32 |
| | | | | 713/168 |
| 2015/0128219 A1* | 5/2015 | Guday | .................... | H04L 63/08 |
| | | | | 726/4 |
| 2015/0186636 A1* | 7/2015 | Tharappel | ............... | G06F 21/32 |
| | | | | 726/8 |

\* cited by examiner

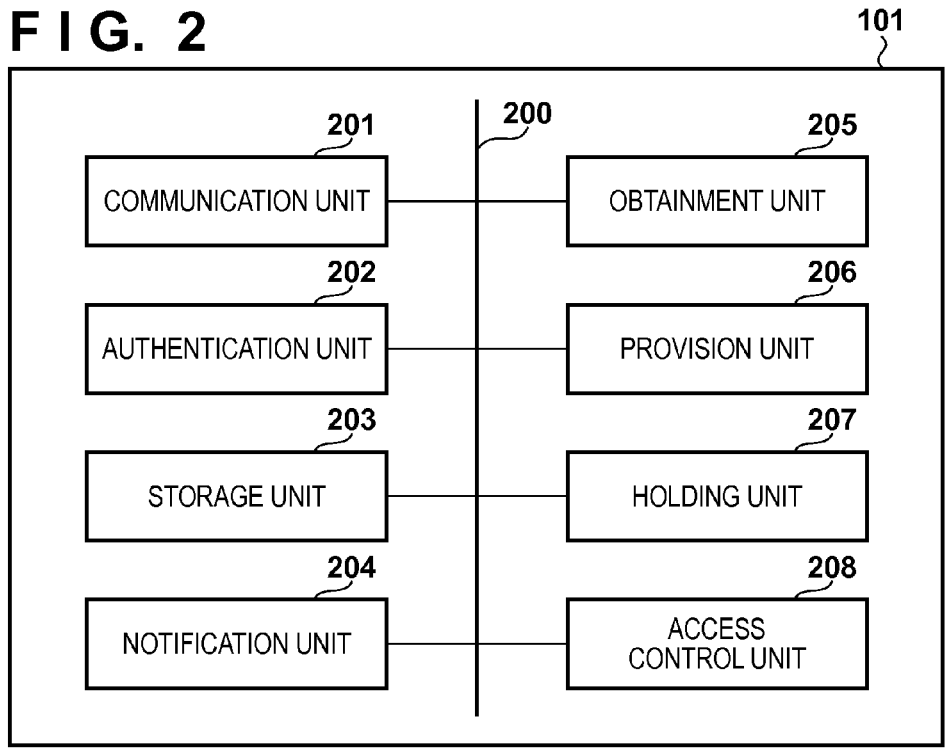
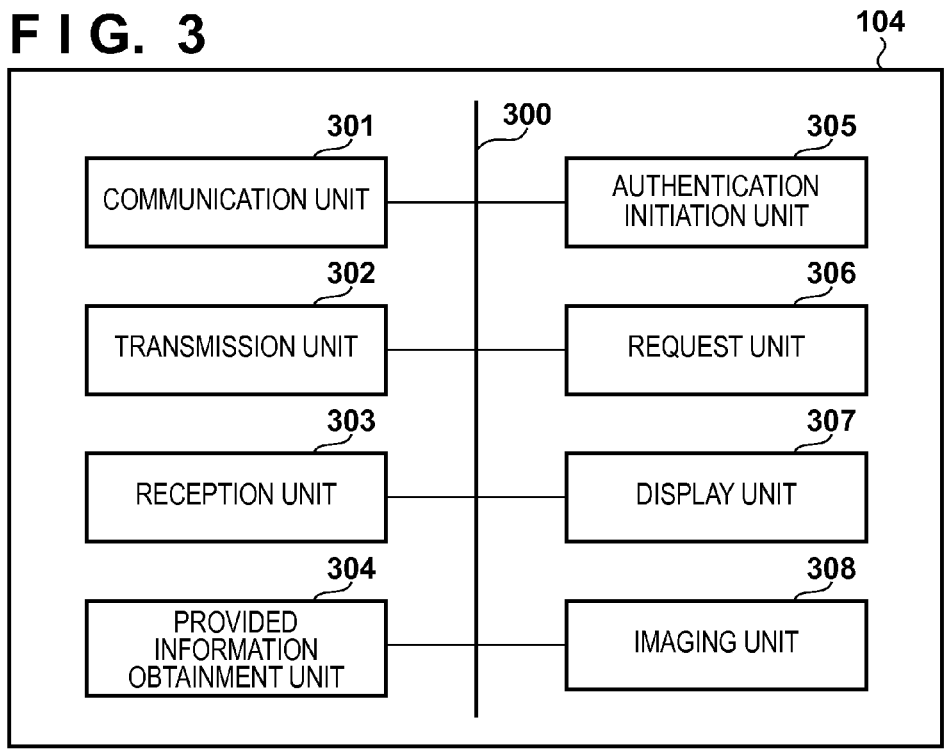

FIG. 7A

| DESTINATION | SERVICE | ADDRESS | PORT | PROTOCOL | ENCRYPTION KEY | PRINT SETTING |
|---|---|---|---|---|---|---|
| TELEVISION102 | CHAT | user@oanon.co.jp/tv | 5222 | XMPP | key1 | COLOR/2 IN 1 |
|  | DISPLAY | 192.168.0.2 | 80 | UDP | key2 | COLOR/2 IN 1 |
| CAMERA103 | IMAGE EXCHANGE | 100.100.0.2 | 8080 | TCP | key3 | COLOR |
| SMART PHONE104 | DATA EXCHANGE | 200.200.1.10 | 80 | TLS | key4 | COLOR/DOUBLE-SIDED |

FIG. 7B

| DESTINATION | SERVICE | ADDRESS | PORT | PROTOCOL | ENCRYPTION KEY | PRINT SETTING |
|---|---|---|---|---|---|---|
| SMART PHONE105 | DATA PROVISION | 201.201.2.20 | 80 | TLS | key5 | COLOR/2 IN 1 |
| CAMERA106 | IMAGE EXCHANGE | 100.100.1.2 | 5000 | TCP | key6 | MONOCHROME |
| PRINTER107 | PRINT | 210.210.1.10 | 880 | TCP | key7 | COLOR/DOUBLE-SIDE |

FIG. 9
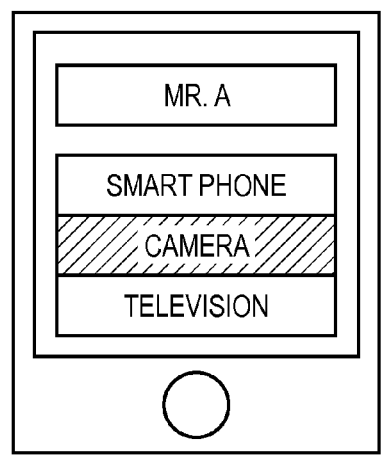
901
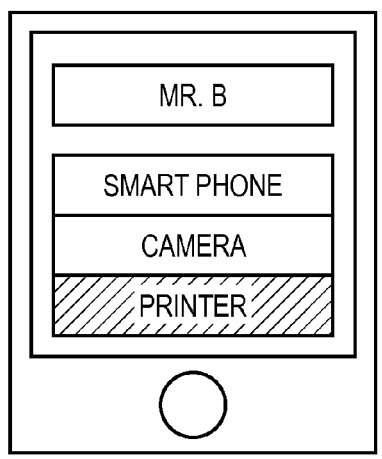
902
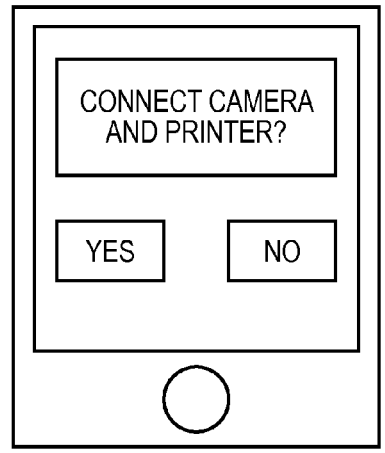
903
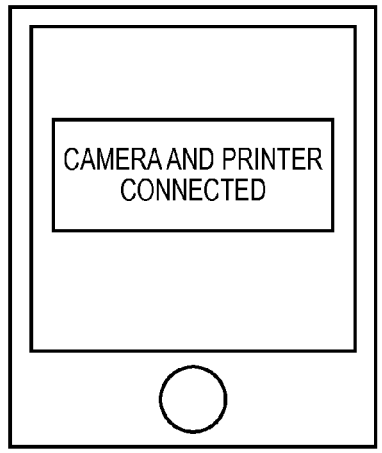
904

COMMUNICATION APPARATUS, COMMUNICATION SYSTEM, METHOD OF CONTROLLING COMMUNICATION APPARATUS, AND STORAGE MEDIUM

BACKGROUND OF THE INVENTION

Field of the Invention

The present invention relates to a communication apparatus, a communication system, a method of controlling the communication apparatus, and a storage medium, and in particular relates to a communication processing technique in which device groups are easily connected.

Description of the Related Art

Due to miniaturization of devices and the spread of wireless LAN in recent years, devices of a carryable size have come to be connected to networks. Also, cases in which a user has multiple devices and uses them depending on their intended uses are increasing. For example, a user may have a smart phone and a single lens reflex camera for carrying around, and a printer for stationary home use. The user may wish to perform communication with another user using these devices.

On the other hand, a technique in which, using NFC (Near Field Communication), a parameter exchange between devices is performed on a one-to-one basis has been known conventionally. Furthermore, in Japanese Patent Laid-Open No. 2010-502109, a single sign-on technique is disclosed as a technique for logging in to a connection destination collectively.

However, in the technique recited in Japanese Patent Laid-Open No. 2010-502109, it is necessary to perform the single sign-on for all devices that a user has, and it is not possible to simplify the parameter exchange between device groups that the user has. Even if used in combination with NFC parameter exchange, a user on a transmitting side must cause all the devices that the user on the transmitting side has to approach a device that a user on a receiving side has, and so a cumbersome operation is required. Also, it may be difficult for the user on the transmitting side and the user on the receiving side to carry all of the devices they respectively have (for example, a television, a printer, or the like).

In view of the above described problems, the present invention provides a technique that realizes easy parameter exchange between device groups that a user has.

SUMMARY OF THE INVENTION

According to one aspect of the present invention, there is provided a communication apparatus comprising: an obtainment unit configured to obtain authentication information from each of a first other communication apparatus and a second other communication apparatus; an authentication unit configured to, based on the authentication information obtained by the obtainment unit, perform authentication processing; and a provision unit configured to provide, based on a result of the authentication processing, information of a third other communication apparatus associated with the first other communication apparatus to a fourth other communication apparatus associated with the second other communication apparatus.

Further features of the present invention will become apparent from the following description of exemplary embodiments with reference to the attached drawings.

BRIEF DESCRIPTION OF THE DRAWINGS

FIG. 2 is a functional block diagram of a communication apparatus 101 according to the first embodiment.

FIG. 3 is a functional block diagram of a smart phone 104 according to the first embodiment.

FIG. 7A-FIG. 7B are views for showing examples of a parameter list according to the first embodiment.

FIG. 9 is a view for illustrating an example, according to the first embodiment, a user interface for when a user A connects a camera 103 with a printer 107 using the smart phone 104.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

1. Configuration of Communication System

Figure 1:
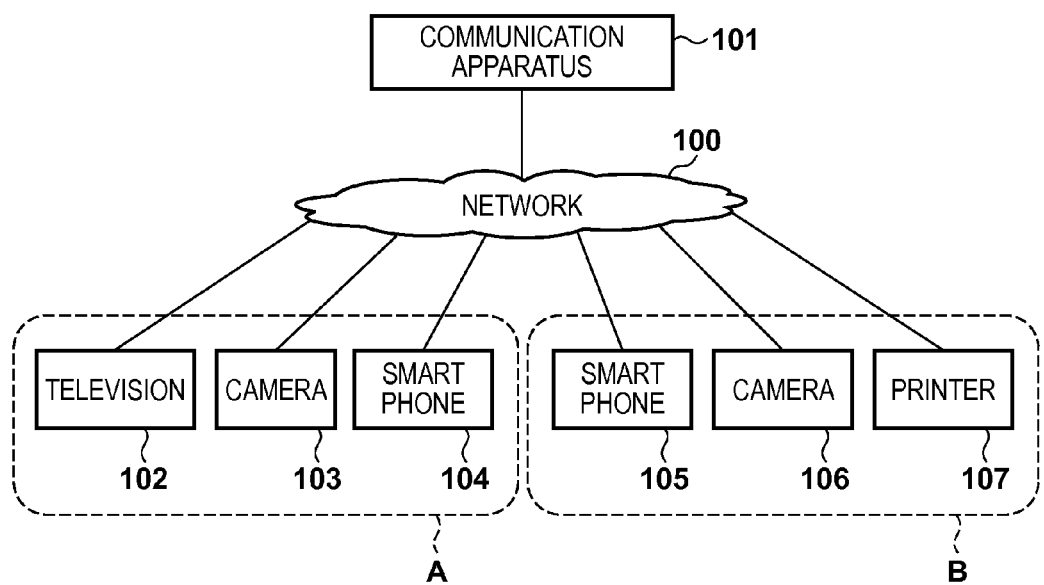
FIG. 1 is a view for illustrating an example configuration of a communication system according to a first embodiment.

First, an example configuration of a communication system according to the first embodiment will be explained with reference to FIG. 1. Reference numeral 100 denotes a network. The network 100 according to the present embodiment can be realized through a composition of the Internet, a WAN (Wide Area Network), a LAN (Local Area Network), or the like.

Reference numeral 101 denotes a communication apparatus. The communication apparatus 101 receives authentication information from device that requests a parameter exchange, and after the communication apparatus 101 performs authentication information confirmation, it provides a parameter of a related device group. The communication apparatus 101 also holds information of relatedness between users, as well as information of relatedness between a user and a device.

Reference numeral 102 denotes a television. A television 102 connects to the network 100, and provides a service via the network. For example, the television 102 provides an image display service for displaying an image on a television screen.

Reference numeral 103 denotes a camera. The camera 103 connects to the network 100, and provides a service via the network. For example, the camera 103 provides an image provisioning service for providing captured image contents.

Reference numeral 104 denotes a smart phone. The smart phone 104 connects to the network 100, and provides a service via the network. For example, the smart phone 104 provides a data provisioning service for providing data included in the smart phone (a schedule, mail history, and the like), or the like.

The television 102, the camera 103, the smart phone 104 are owned by a user A. The communication apparatus 101 holds information of an ownership relationship of a device group and the user A.

Reference numeral 105 denotes a smart phone. Since a similar configuration to the smart phone 104 is used, explanation here will be omitted. Reference numeral 106 denotes a camera. Since a similar configuration to the camera 103 is used, explanation here will be omitted. Reference numeral 107 denotes a printer. The printer 107 connects to the network 100, and provides a service via the network. For example, the printer 107 provides a print service for printing on the printer, or the like.

The smart phone 105, the camera 106, and the printer 107 are owned by user B. The communication apparatus 101 holds an ownership relationship between a device group and the user B. The communication apparatus 101 further holds information of relatedness between the user A and the user B (friend, company, family, or the like).

2. Functional Block Configuration of Communication Apparatus

FIG. 2 is a functional block diagram of the communication apparatus 101. The communication apparatus 101 is provided with a communication unit 201, an authentication unit 202, a storage unit 203, a notification unit 204, an obtainment unit 205, a provision unit 206, a holding unit 207, and an access control unit 208. Each processing unit is connected by a bus 200, and is realized by a CPU, that is not shown, executing a program that is read out from the holding unit 207 or the storage unit 203.

The communication unit 201 performs communication protocol processing of TCP/IP and the like, and provides a function for connecting with the network 100.

The authentication unit 202 confirms if authentication information is correct. The authentication unit 202 checks authentication information obtained from a device (for example, the smart phone 104 or the smart phone 105), and performs confirmation as to whether or not the authentication information is correct. The authentication unit 202 performs authentication by using a certificate, a public key, or the like. Limitation is not made to this, and a specific random number that can be used only between devices and a password may be used to confirm that authentication between the devices is completed, from the smart phone 104 and the smart phone 105. Also, it is possible to realize the authentication through the use of biometric authentication, or the like.

The storage unit 203 stores a parameter for each device. The notification unit 204 notifies of a success and of a error for an authentication. The notification unit 204 notifies each device that an authentication succeeded or failed. Also, the notification unit 204 notifies a device that performed the authentication that parameter exchange has been completed.

The obtainment unit 205 obtains authentication information. The obtainment unit 205 receives authentication information that is transmitted from each device. Limitation is not made to this, and alternatively configuration may be taken such that the obtainment unit 205 obtains authentication information by making a query at regular intervals to each device. Also, in the present embodiment, an example of each device transmitting authentication information will be explained; however limitation is not made to this, and configuration may be taken such that a representative device collectively transmits authentication information.

The provision unit 206 provides a parameter related to a device. The holding unit 207 holds information of relatedness between a device and a user, and information of relatedness of a device group. The holding unit 207 holds information relating to what kind of devices a user owns. In the present embodiment, an example in which a device is associated with a user will be explained; however limitation is not made to this, and, for example, configuration may be taken such that an organization and location are also associated. Additionally, configuration may be taken such that a device group is handled as a group, and information relating to which device falls under which group and information of relatedness between groups is held.

The access control unit 208, based on relatedness information held in the holding unit 207, determines a range of a parameter exchange, i.e. a range of communication apparatuses for which to permit the provision of the information by the provision unit 206. The access control unit 208 may perform control in units of devices, and it may perform control in units of applications included in a device.

Note, the configuration of the functional blocks above is only an example, and a configuration may be taken so as to configure a plurality of functional blocks from a single functional block, and a functional block further may be comprised of a plurality of functional blocks that are divided.

3. Functional Block Configuration of Smart Phone

FIG. 3 is a functional block diagram of the smart phone 104. The smart phone 104 is provided with a communication unit 301, a transmission unit 302, a reception unit 303, a provided information obtainment unit 304, an authentication initiation unit 305, a request unit 306, a display unit 307, and an imaging unit 308. Each processing unit is connected by a bus 300, and is realized by a CPU that is not shown, executing a program that is read out from memory.

The communication unit 301 performs communication protocol processing of TCP/IP, or the like, and provides a function for connecting with the network 100. The transmission unit 302 transmits authentication information to the communication apparatus 101. The reception unit 303 receives a notification of a success or of an error of an authentication. The reception unit 303 receives that a parameter exchange has been completed. The provided information obtainment unit 304 obtains a parameter for accessing the smart phone 104.

The authentication initiation unit 305 initiates authentication of another device. In the present embodiment, NFC is used, however, limitation is not made to this, and Bluetooth (registered trademark), wireless LAN, or the like may be used. Also by linkage of positional information and sensor information, authentication of another device can be realized by using a technique for falsely notifying that the other device in the vicinity. The authentication initiation unit 305 may perform authentication within a communication path that was generated with another device, or may perform authentication via another server. Additionally, limitation is not made to this, and the authentication initiation unit 305 may exchange information (for example, a certificate and the like) for authentication.

The request unit 306 makes a request for a device group parameter exchange to the communication apparatus 101. The display unit 307 displays that authentication has been initiated, that a parameter exchange has been completed, and that an error has occurred, to a screen. Note, in the present embodiment these are displayed to a screen; however, limitation is not made to this, and notification by lighting of an LED, notification by audio, and notification by vibration, may be performed, distinguishing an authentication initiation, a parameter exchange completion, and an error occurrence, or the like. The imaging unit 308 captures an image.

Note, the configuration of the functional blocks above is only an example, and a configuration may be taken so as to configure a plurality of functional blocks from a single functional block, and a functional block further may be comprised of a plurality of functional blocks that are divided.

Also, here an example of the smart phone 104 was explained; however the television 102, the camera 103, the smart phone 105, the camera 106, and the printer 107 also include a similar configuration to the smart phone 104. However, the television 102 and the printer 107 are different in that they are not provided with the imaging unit 308. Also, it is possible that there is a case where the printer 107 is not provided with the display unit 307.

4. Sequence Upon Initiation of Parameter Exchange

Figure 4:
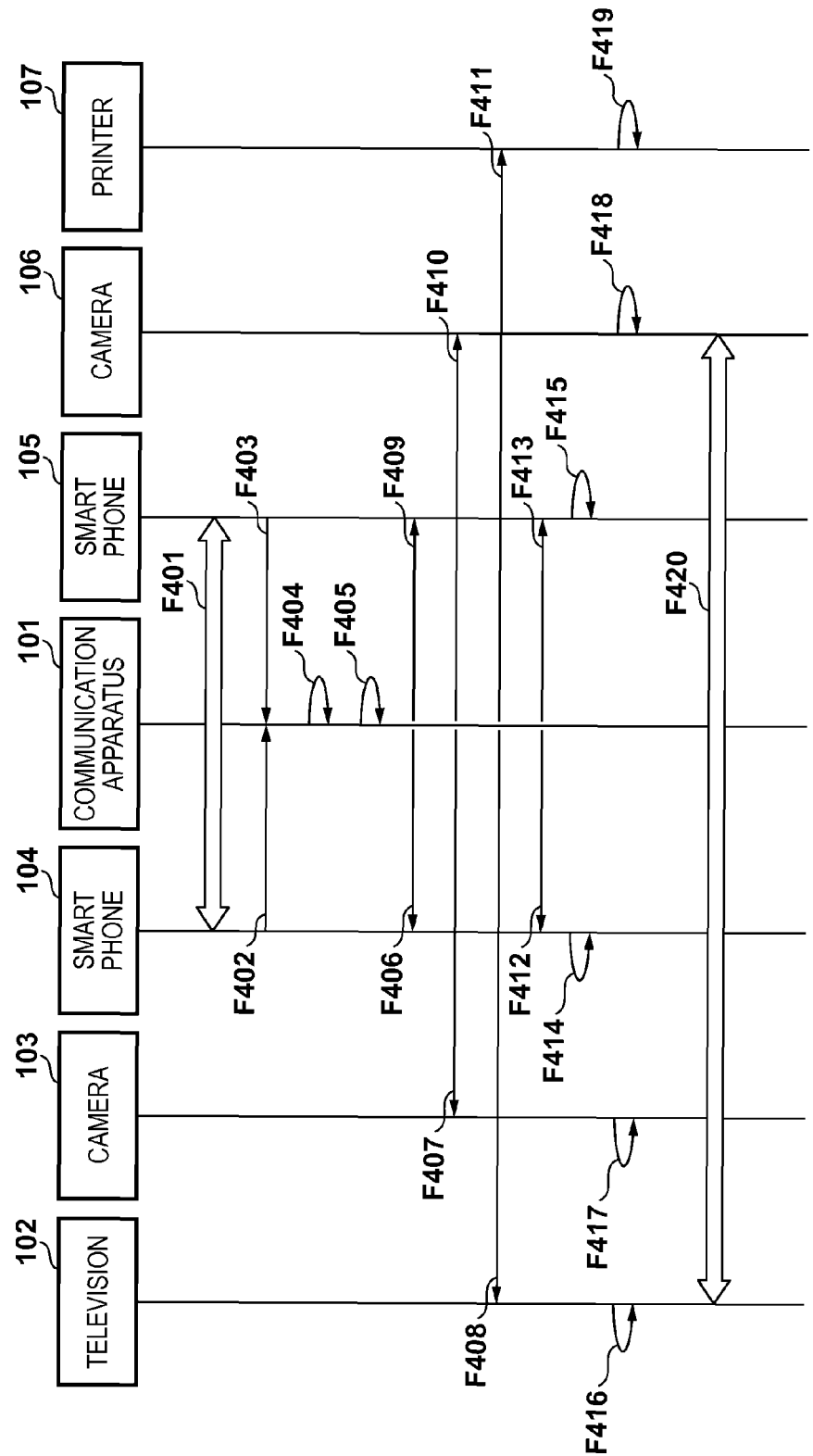
FIG. 4 is a sequence diagram performed upon a parameter exchange initiation according to the first embodiment.

Next, an explanation will be given with reference to FIG. 4, concerning a sequence upon an initiation of a parameter exchange. Here, it is assumed that user A initiates the parameter exchange with user B.

First, user A comes within a proximity or touches the smart phone 105 of user B to the smart phone 104. The smart phone 104 initiates authentication by NFC with the smart phone 105 (F401). Once authentication with the smart phone 105 is complete, the smart phone 104 transmits secret authentication information generated with the smart phone 105 to the communication apparatus 101 (F402). Similarly, the smart phone 105 transmits secret authentication information generated with the smart phone 104 to the communication apparatus 101 (F403).

The communication apparatus 101 performs authentication processing using the authentication information received from the smart phone 104 and the authentication information received from the smart phone 105 (F404). This is not limited to a method of authentication processing, and methods using a certificate or a random number, or a method using a password may also be used. Also, this can be realized by using another authentication method or a method that corresponds thereto. If the communication apparatus 101 determines that authentication processing succeeded, it executes parameter exchange processing (F405). On the other hand, if the communication apparatus 101 determines that authentication processing has failed, it does not execute the parameter exchange processing, and after transmitting an error, it terminates the processing.

The communication apparatus 101 generates a parameter list for transmitting to each of a device, from a list (details will be explained later) as shown in FIG. 7A and FIG. 7B.

Here, the communication apparatus 101 restricts a service and a device for which a parameter is transmitted based on relatedness of user A and user B. For example, if the relatedness of user A and user B is family, all devices are exposed; however, if the relatedness of user A and user B is friend, then only a portion of the devices are exposed (for example, configuration is taken such that a home printer is not exposed). In this way, by suppressing transmission of a parameter according to relatedness information, there is the effect that a user is able to perform parameter exchange easily.

If there is no relatedness between user A and user B, then parameter exchange may be performed for only limited devices. For example, for a first authentication, parameter exchange may be performed for only the smart phone 104 and the smart phone 105. Additionally, in the case authentication is performed one more time, a configuration may be taken wherein parameter exchange is performed with all devices. Because of this, there is the effect that it becomes possible for people meeting for the first time to easily connect. Also, configuration may be taken such that it is prompted that relatedness information be generated by displaying a dialogue as to whether or not one wishes to become friends at the first touch for an authenticated device (here the smart phone 104 and the smart phone 105). Because of this, there is the effect that a malfunction due to erroneous operation can be prevented.

Alternatively, configuration may be taken such that based on a combination of services, parameters are only exchanged between devices that have connectable services. With this, there is the effect that it becomes unnecessary to perform unnecessary parameter exchange, and a load of processing is reduced.

Additionally, the communication apparatus 101 transmits a parameter to the smart phone 104, the camera 103, and the television 102 respectively (F406-F408). Similarly, the communication apparatus 101 transmits a parameter to each of the smart phone 105, the camera 106, and the printer 107 (F409-F411).

The communication apparatus 101 notifies the smart phone 104 that the parameter exchange is complete (F412). The communication apparatus 101 notifies the smart phone 105 that the parameter exchange is complete (F413).

The smart phone 104 receives a notification of the parameter exchange completion from the communication apparatus 101. The smart phone 104 displays that authentication between user A and user B is complete, and that the parameter exchange has completed (F414). Similarly, the smart phone 105 receives a notification of completion from the communication apparatus 101. The smart phone 105 displays that authentication between user A and user B is complete, and that the parameter exchange has completed (F415).

The television 102 displays that authentication between user A and user B is complete, and that the parameter exchange has completed (F416). The camera 103 displays that authentication between user A and user B is complete, and that the parameter exchange has completed (F417).

The camera 106 displays that authentication between user A and user B is complete, and that the parameter exchange has completed (F418). The printer 107 displays that authentication between user A and user B is complete, and that the parameter exchange has completed (F419).

Note, in the present embodiment, an example is explained wherein an authentication between user A and user B is completed; however, limitation is not made to this, and configuration may be taken such that it is displayed that the authentication between the smart phone 104 and the smart phone 105 is complete. Also, configuration may be taken such that depending on the parameter exchange, a type of device or service that is connectable is displayed. In the present embodiment, a user is notified of completion by display; however configuration may be taken such that a user is notified by LED, audio, vibration, or the like.

Also, the television 102 performs a connection using a parameter that is exchanged with the camera 106 (F420). User A may connect to the camera 106 by operating the television 102, and user B may connect to the television 102 by operating the camera 106. Additionally, user A may use the smart phone 104 to make an instruction such that the camera 106 of user B and the television 102 are connected. Similarly, user B may use the smart phone 105 to make an instruction such that the camera 106 of user A and the television 102 are connected.

5. Processing Executed by Communication Apparatus

Figure 5:
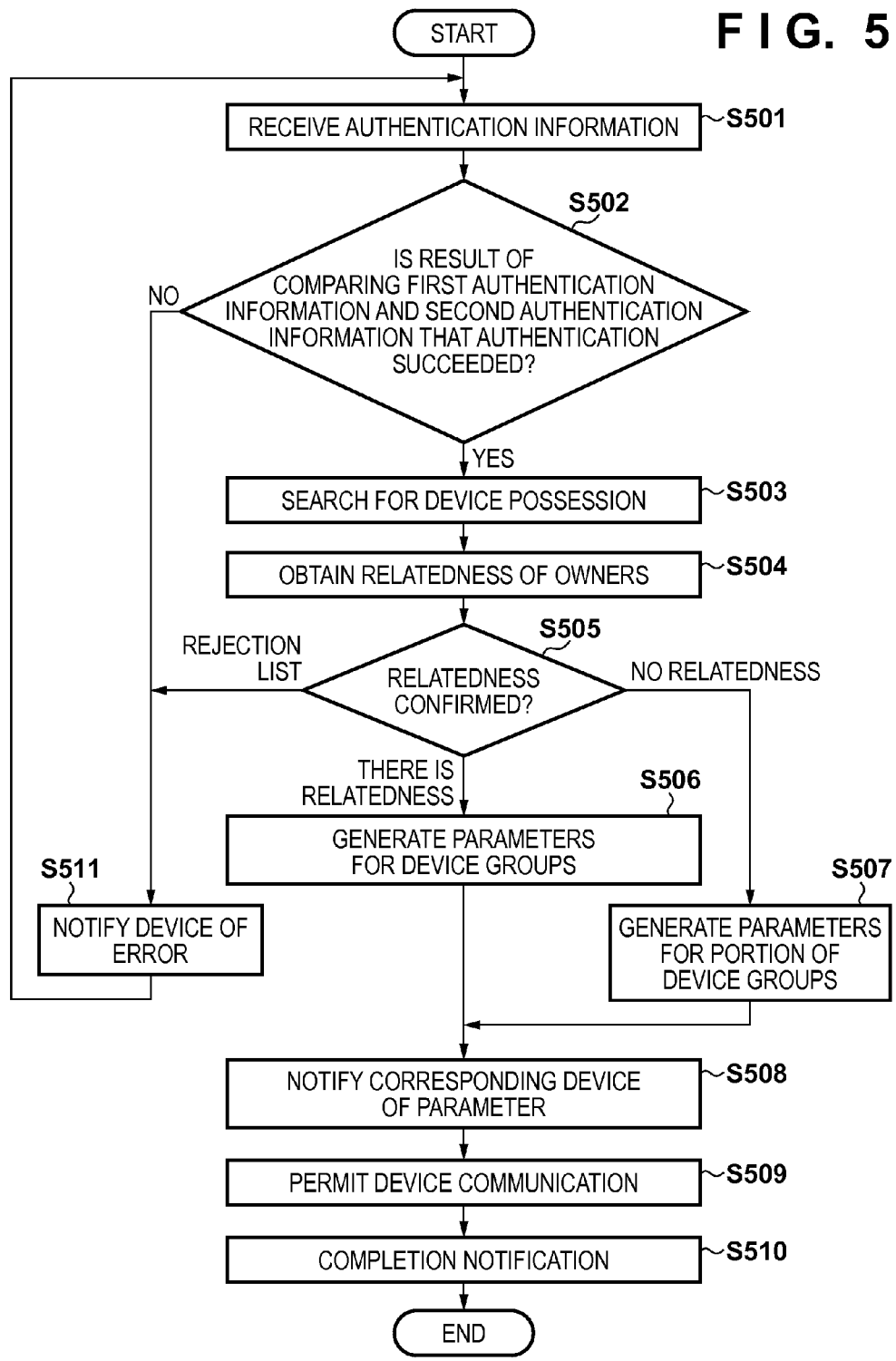
FIG. 5 is a flowchart for showing a processing procedure in a case of the communication apparatus 101 according to the first embodiment, receiving authentication information.

FIG. 5 is a flowchart for showing a processing procedure in a case of the communication apparatus 101 receiving authentication information.

The obtainment unit 205 receives authentication information from the smart phone 104 or the smart phone 105 through the communication unit 201 (step S501).

The authentication unit 202 compares and matches first authentication information received from the smart phone 104 with second authentication information received from the smart phone 105 (step S502).

Once the authentication is determined to have succeeded by the authentication unit 202 (step S502; YES), the holding unit 207 performs searching as to who the device is a belonging of (step S503). In the present embodiment, an example is shown for possession by a user; however, limitation is not made to this, and possession by an organization or a group which is a device group may also be possible.

On the other hand, once the authentication unit 202 determines that the authentication has failed (step S502; NO), the notification unit 204 performs an error notification to the smart phone 104 or the smart phone 105, which performed the request (step S511). Also, if two authentication information items are not gotten within a predetermined time, the authentication unit 202 determines there to be an error. The notification unit 204 performs notification of an error only to devices that delivered authentication information.

The holding unit 207 obtains relatedness information between user A and user B (step S504). Configuration may be taken such that the holding unit 207 obtains relatedness information from a database within the communication apparatus 101, or such that it obtains relatedness information from a database, or something similar, on another server, or the like. In the present embodiment, relatedness between users is shown, however it may also be relatedness between a user and an organization, or relatedness between groups of device groups.

The access control unit 208 performs confirmation of obtained relatedness information (step S505). The access control unit 208 performs confirmation of an existence or absence of relatedness, or, if it is entered in a rejection list. Limitation is not made to this, and the access control unit 208, may use a type of relatedness (family, friend, organization relationship) or a strength that shows a depth of relatedness. In this case, a configuration may be taken such that, for example, if the relatedness is family, a parameter exchange for all devices can be performed, and if it is friend, a parameter exchange for only a portion of the devices can be performed. Through this, a user can perform parameter exchange easily. In this way, the access control unit 208, based on the obtained relatedness information, controls a range of communication apparatuses for which to permit the provision of the information (parameter) by the provision unit 206.

Also, in the case that a strength of relatedness (for example, if it is an acquaintance or a close friend) is used, a configuration may be taken such that if it is greater than or equal to a fixed strength, the parameter exchange is performed. Also, other than relatedness between users, relatedness of a user and an organization affiliation may be used. In the present embodiment, relatedness information is held in the communication apparatus 101; however, limitation is not made to this, and it is possible to realize the present invention using organization information, telephone number list information, SNS information and the like.

Here, if the access control unit 208 determines there is relatedness, generation of parameters for all device groups is performed (step S506). On the other hand, if the access control unit 208 determines there is no relatedness, generation of parameters for only a portion of the device groups is performed (step S507). For example, in the case that there is no relatedness, and for the printer there is a setting to not expose, exchange of parameters included in the printer is not performed. Alternatively, exchange of a parameter associated with the printer 107 and a parameter for print settings is not performed. In this way, by restricting provision of parameters to a portion of devices, an amount of data can be reduced. Additionally, transmission of unnecessary parameters ceases to occur, and there is an effect of security improvement and reduction of processing load.

If the access control unit 208 determines that a partner communication apparatus is included in a rejection list, a parameter exchange is not performed, and the smart phone 104 and the smart phone 105 are notified of the error (step S511). It is possible to modify the rejection list if each device that is owned by the respective users accesses the communication apparatus 101. Limitation is not made to this, and, for example, an administrator who provides the communication apparatus 101 may perform setting in the form of a filter. In the case that pairing that uses geographic positional information and time information, if there is a malicious third party near user A and user B, there is a possibility that a parameter exchange may occur with the malicious third party without user A or user B knowing. If there is a rejection list, there is an effect in that security is improved because it is possible to decrease useless parameter exchange being performed.

The provision unit 206 provides a parameter towards the devices to which to transmit the parameter (step S508). After this, the access control unit 208 performs device communication permission settings for a proxy or a server (step S509). With this, in a case in which it is not possible for a device to perform a direct connection, communication can be performed via a proxy and server.

Finally, the notification unit 204 notifies the smart phone 104 and the smart phone 105 that the parameter exchange has been completed (step S510). This completion notification can be transmitted to a portion of or to all other devices.

6. Processing Executed by Smart Phone

Figure 6:
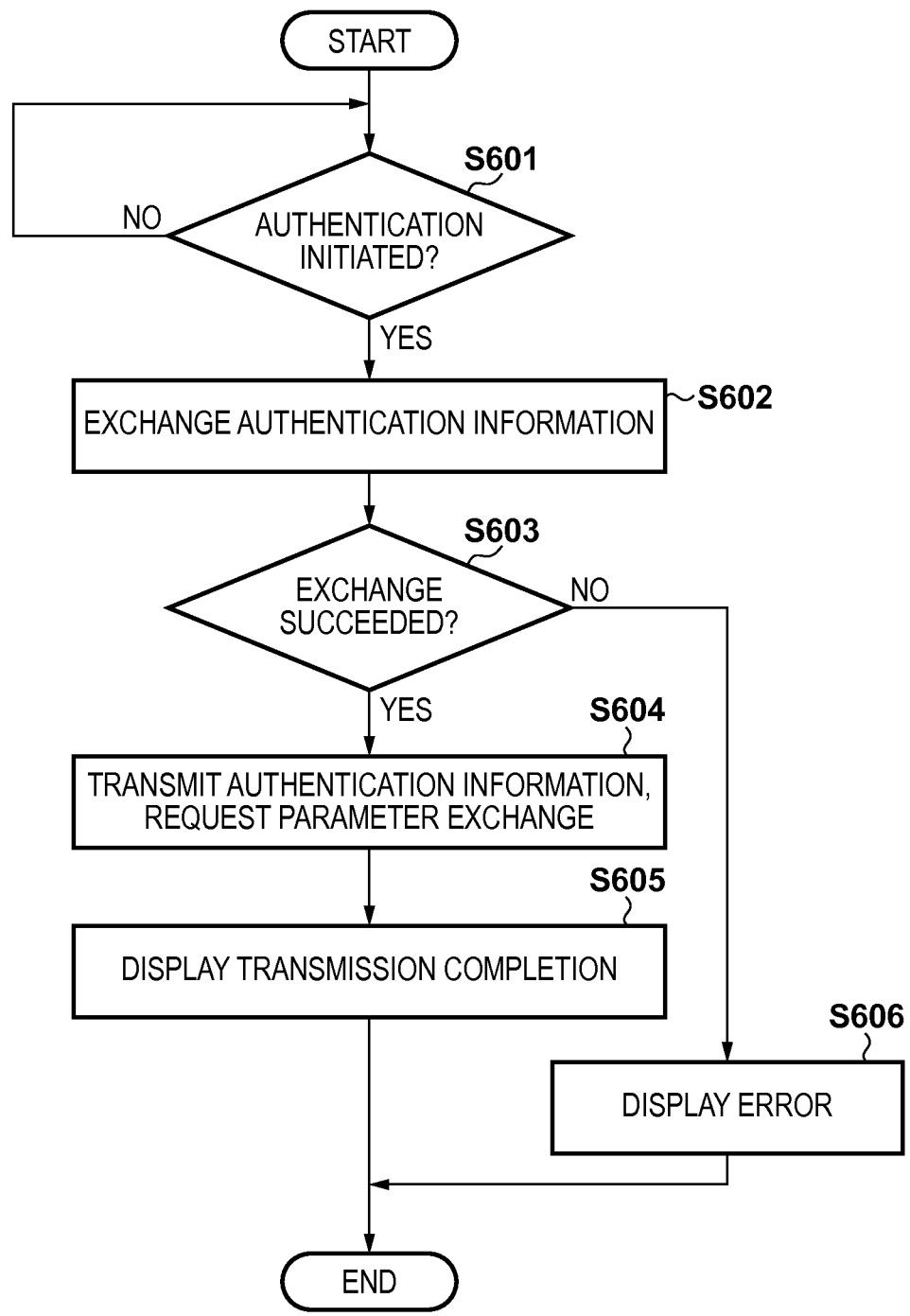
FIG. 6 is a flowchart for showing a processing procedure in a case of the smart phone 104 according to the first embodiment, initiating an authentication.

FIG. 6 is a flowchart for showing a processing procedure in a case of the smart phone 104 initiating an authentication.

The authentication initiation unit 305 performs an NFC connection with the smart phone 105, and initiates authentication (step S601). In the present embodiment, an explanation will be given for authentication initiation processing between smart phones; however, limitation is not made to this, and authentication initiation processing can be performed between any devices (for example, a camera and a television) of a device group. Because of this, a user can initiate authentication on any device, and it becomes unnecessary to carry a specific device, improving usability.

The authentication initiation unit 305 performs an exchange of authentication information with the smart phone 105 (step S602). The authentication initiation unit 305 performs confirmation if the exchange of authentication information succeeded or not (the step S603). If the authentication initiation unit 305 determines that the exchange of authentication information succeeded (step S603; YES), the transmission unit 302 transmits authentication information to the communication apparatus 101 via the communication unit 301.

Additionally, the request unit 306 requests a parameter exchange of the communication apparatus 101 via the communication unit 301 (step S604). After this, the display unit 307 displays transmission completion (step S605). At this time, the reception unit 303 may receive a notification of transmission completion from the communication apparatus 101. Meanwhile, if the authentication initiation unit 305 determines that the exchange of authentication information failed (step S603; NO), the display unit 307 displays an error (step S606).

Figure 10:
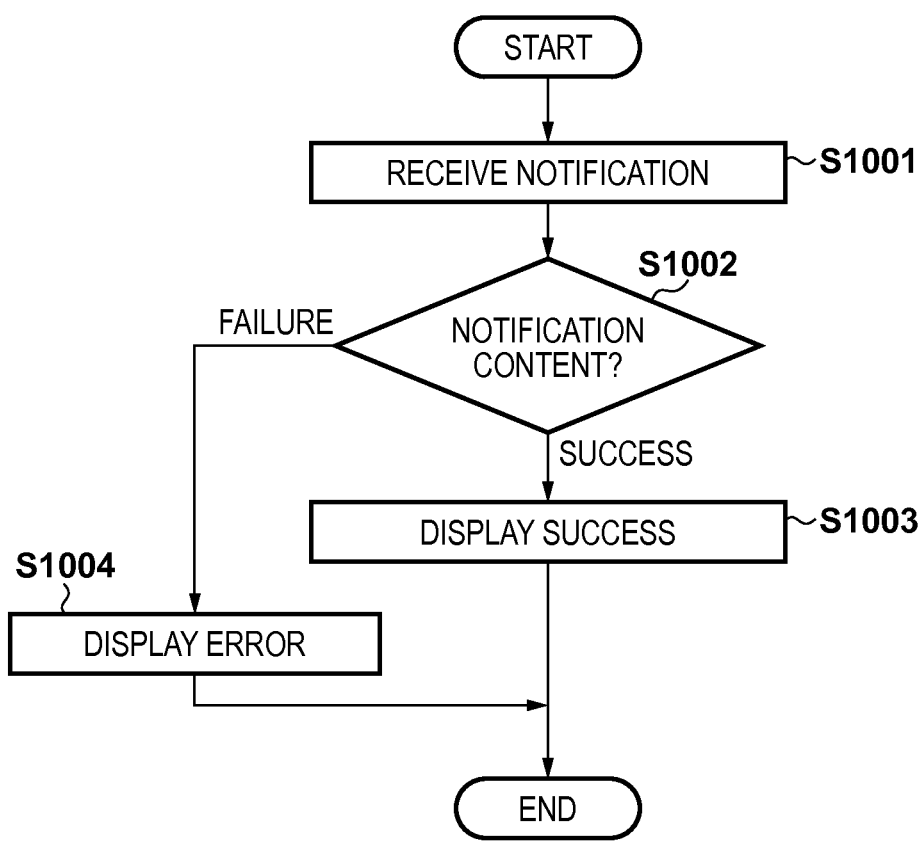
FIG. 10 is a flowchart for showing a processing procedure, according to the first embodiment, in a case of the smart phone 104 receiving a notification from the communication apparatus 101.

Next, FIG. 10 is a flowchart for showing a processing procedure in a case of the smart phone 104 receiving a notification from the communication apparatus 101.

The reception unit 303 receives a notification from the communication apparatus 101 (step S1001). The display unit 307 performs confirmation of the notification content (step S1002). If the display unit 307 determines that the notification content is a success, then success is displayed (step S1003). If the display unit 307 determines that the notification content is a failure, then an error is displayed (step S1004).

Figure 11:
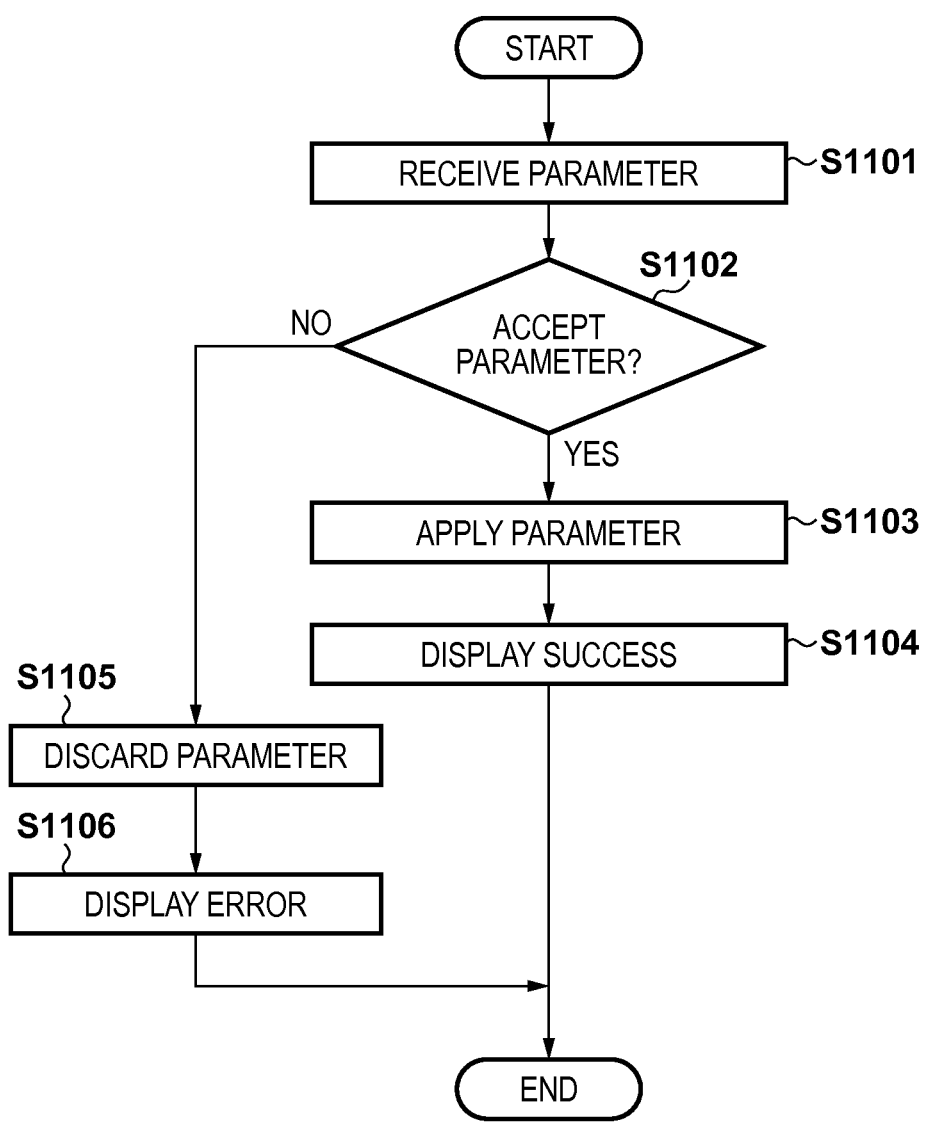
FIG. 11 is a flowchart for showing a processing procedure, according to the first embodiment, in a case of the smart phone 104 receiving a parameter from the communication apparatus 101.

Additionally, FIG. 11 is a flowchart for when the smart phone 104 receives a parameter from the communication apparatus 101.

The provided information obtainment unit 304 receives a parameter from the communication apparatus 101 (step S1101). The provided information obtainment unit 304 determines whether or not to accept the received parameter from the communication apparatus 101 (step S1102). For example, in the case there is a setting to not connect with another device beforehand, the parameter is not accepted. Also, configuration may be taken such that a dialogue is displayed through the display unit 307, and input of an acceptance instruction by a user is accepted.

If the provided information obtainment unit 304 determines that the parameter is accepted from the communication apparatus 101, the parameter is applied to each type of application (step S1103). The display unit 307 displays that a parameter has been applied (step S1104).

Meanwhile, if the provided information obtainment unit 304 determines that the parameter is not accepted from the communication apparatus 101, the parameter is discarded (step S1105). The display unit 307 displays an error that the parameter was discarded (step S1106). Note, a display of parameter application or parameter discard is shown; however, limitation is not made to this, and a notification may be made through an LED, audio and vibration, or the like.

Here, FIG. 7A and FIG. 7B are examples of parameter lists. FIG. 7A is for parameters of a device group owned by user A, FIG. 7B is for parameters of a device group owned by user B.

An explanation will be given using the television 102 as an example. The television 102 has two services (chat and display), and holds respective addresses, port numbers, protocols, encryption keys, and print settings information for communication for each. Parameter information is not limited to communication parameters, and may include color management settings, audio settings, a certificate, user interface settings, security settings or the like.

Also, in the present embodiment communication addresses are shown in units of services; however, limitation is not made to this, and these may be distributed in high order protocols for each service, with one for every device (for example, one communication path by VPN use can be seen). As mentioned previously, the communication apparatus 101 transmits, to a device, a portion of or all of the parameters in the parameter list.

7. Smart Phone User Interface

Figure 8:
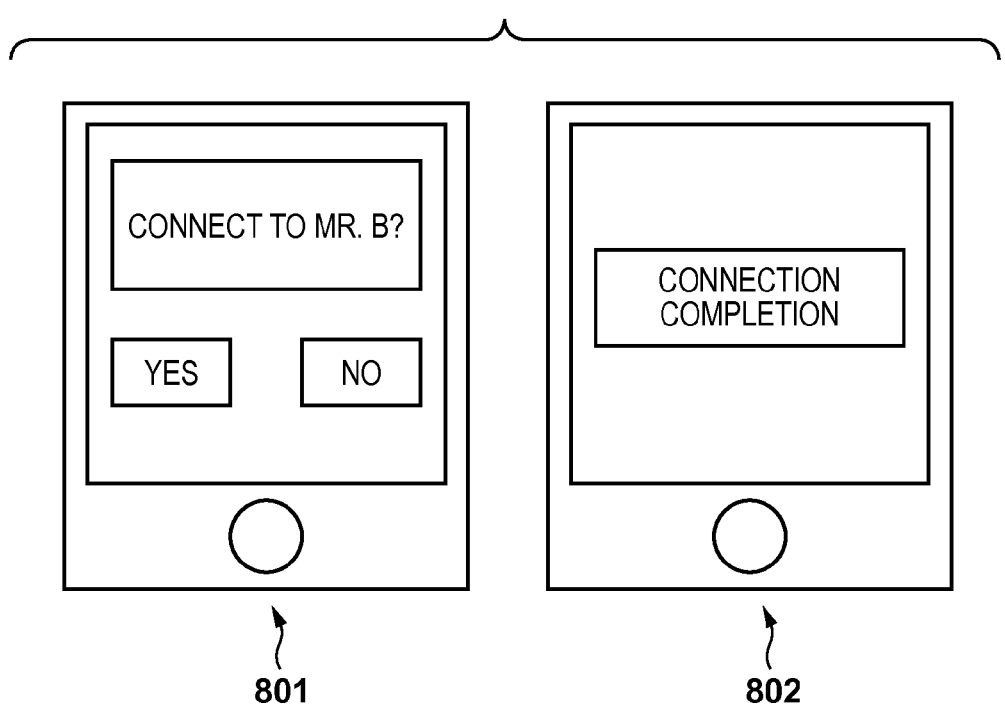
FIG. 8 is a view for showing an example of a user interface of the smart phone 104 according to the first embodiment.

Reference numerals 801 and 802 of FIG. 8 are figures showing user interfaces of the smart phone 104. Reference numeral 801 of FIG. 8, is a screen for when a user A uses the smart phone 104 to perform authentication and parameter exchange when approaching the smart phone 105 of user B (F401). If user A consents to connect, the smart phone 104 transmits to the communication apparatus 101 after authentication information exchange with the smart phone 105 (F402, F403). Similarly, for a screen on the smart phone 105 (user B) side, a screen showing whether user A consents to connect may be displayed. In such a case, only when both users consent, does the processing proceed to the next step. Reference numeral 802 of FIG. 8 is a screen for displaying a completion notification when the smart phone 104 receives completion of a parameter exchange.

Reference numerals 901-904 of FIG. 9 are views for showing user interfaces for when the user A uses the smart phone 104 and connects the camera 103 and the printer 107.

User A selects a device from a list of devices held by user A (reference numeral 901 of FIG. 9). After this, user A selects a device from a list of devices held by user B (reference numeral 902 of FIG. 9). In the present embodiment, the camera 103 and the printer 107 are selected. Reference numeral 903 of FIG. 9 displays a dialogue of whether or not it is ok to connect the camera 103 and the printer 107. If user A instructs to connect the camera 103 and the printer 107, a connection instruction is transmitted to the camera 103 and the printer 107 via the communication apparatus 101. Once the connection has completed, a dialogue is displayed to notify that connection has completed (reference numeral 904 of FIG. 9). Here the smart phone 104 sends a connection instruction via the communication apparatus 101; however limitation is not made to this, and a direct connection instruction may be sent to each device, or a connection instruction may be sent to only one of the devices. In the present embodiment the camera 103 connects to the printer 107, and performs double-sided printing in color of image data. In a case that there is a plurality of services, as with the television 102, a service to be executed may be selected.

As explained above, in the present embodiment, authentication is performed for any device from out of devices that are included in a device group, and the authentication result is transmitted to a server (the communication apparatus 101). The server provides information of devices that are included in the device group that a device that falls under based on the authentication result.

By virtue of the present embodiment, it becomes possible to realize parameter exchange easily between device groups owned by a user. For this reason, in the case that a user possesses a plurality of devices and exchanges parameters of these, user processing can be reduced. What required a plurality of times in the prior art can be realized with only a single pairing process. Because of this, usability is improved. Additionally, it becomes possible to perform parameter exchange for a device that the user is currently not carrying.

Second Embodiment

Figure 12:
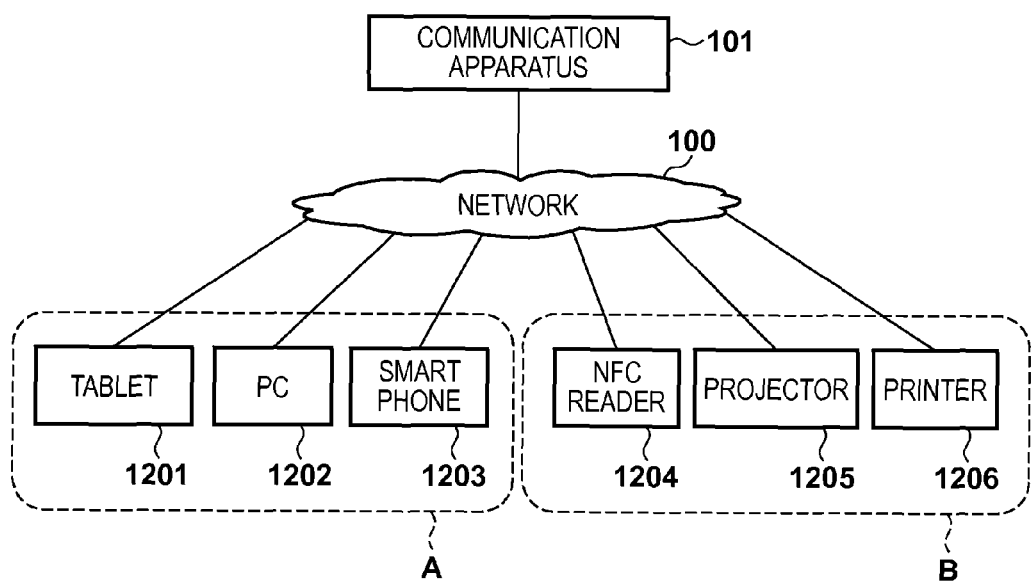
FIG. 12 is a view for illustrating an example configuration of a communication system according to a second embodiment.

Hereinafter, an explanation will be given centering around differences with the first embodiment. FIG. 12 is a view for illustrating an example configuration of a communication system according to a second embodiment. Reference numeral 1201 is a tablet for connecting with the communication apparatus 101 via the network 100. The tablet 1201 accesses an image provision function of another device via the network 100, and displays an image on the screen. Reference numeral 1202 is a PC (personal computer) that connects to the network 100 via the communication apparatus 101.

Reference numeral 1203 is a smart phone for connecting with the communication apparatus 101 via the network 100. The tablet 1201 and the PC 1202 can take a configuration in which they connect with the network 100 via the smart phone 1203. In such a case, the smart phone 1203 is responsible for a function of a mobile router. 1204 is an NFC reader that performs authentication by NFC. Here, an example was given that uses NFC; however limitation is not made to this, and short-range wireless may also be used. Also, a password, a certificate, and a biometric authentication may also be used for an authentication mode. Reference numeral 1205 is a projector for displaying image information received from another device connected to the network 100. Reference numeral 1206 is a printer for printing image information received from another device connected to the network 100.

The tablet 1201—the printer 1206 are commonly provided with a communication unit 301-a request unit 306 out of the configuration of the modules explained in FIG. 3 of the first embodiment. For example, if it is the NFC reader 1204, it does not have the display unit 307 or the imaging unit 308. Note, an example in the present embodiment is explained in which all devices are provided with the authentication initiation unit 305; however limitation is not made to this, and configuration may be taken such that only a portion of the devices have the authentication initiation unit 305.

Next an explanation will be given where the smart phone 1203 comprises, for example, an NFC card (not shown). The NFC card and each device (the tablet 1201, the PC 1202) are associated. The NFC card does not have a function to directly communicate with the communication apparatus 101. Once the NFC reader 1204 authenticates the NFC card, it transmits the authentication information of the NFC reader 1204 and the authentication information of the NFC card to the communication apparatus 101. It is not necessary for the device that authenticates and the device that is authenticated to transmit authentication information, and another device may perform this in place of these devices.

Of course, a device associated with the NFC card (the tablet 1201 or the PC 1202) may transmit authentication information of the NFC card to the communication apparatus 101 in place of the devices. For example, after a user touches an NFC card to the NFC reader 1204, a timing for transmitting to the communication apparatus 101 can be conveyed by touching the PC 1202. Other than this, it can be realized by the NFC card transmitting an address of the PC 1202 to the NFC reader 1204, and the NFC reader 1204 transmitting a message prompting the transmission of authentication information to the communication apparatus 101 to the PC 1202.

The smart phone 1203 is associated with the tablet 1201 and the PC 1202 and grouped. This information is held by the holding unit 207 of the communication apparatus 101.

The NFC reader 1204 is associated with the projector 1205 and the printer 1206, and grouped. The NFC reader 1204 may be coordinated with a function for managing entry and exit of a conference room. Holding up a smart phone 1203 and entering or exiting a conference room creates a state in which a device group (the tablet 1201 and the PC 1202) associated with the smart phone 1203 and a device group (the projector 1205 and the printer 1206) within the conference room are usable. Through this, a user is enabled to easily use a device of a device group that is not set and that is installed.

If the smart phone 1203 is distributed from a company, it is managed by the company. Management information of the smart phone 1203 and conference room entry and exit permission information can be used and access permission to a device group held by the NFC reader 1204 may be performed.

Configuration may be taken such that the communication apparatus 101 performs only confirmation of authentication information, and that parameter exchange is performed between authenticated devices. After this, parameters may be distributed to device groups to which the authenticated devices are associated.

In the present embodiment above, explanation was given for an example of a parameter exchange by an authentication between a device group and a device group. By virtue of the present embodiment, it is possible to realize parameter exchange easily between device groups that a user owns. Note, a similar effect can be realized by lending the smart phone 1203 to a user. In a case in which a rented conference room is predicted, it can be considered that user registration cannot be performed in advance. In such a case, the same effect can be obtained as can in the present invention by lending a device for which registration is performed previously.

By virtue of the present invention, it is possible to realize parameter exchange easily between device groups that a user owns.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-024731, filed Feb. 12, 2014, which is hereby incorporated by reference herein in its entirety.

What is claimed is:

1. A communication apparatus comprising:
at least one processor; and
at least one memory storing instructions which, when executed by the at least one processor, cause the communication apparatus to:
obtain authentication information from each of a first other communication apparatus and a second other communication apparatus;
perform authentication processing based on the obtained authentication information;
identify a first owner of the first other communication apparatus and a second owner of the second other communication apparatus;
evaluate relatedness information of a relatedness between a first communication device group including the first other communication apparatus and a third other communication apparatus, and a second communication device group including the second other communication apparatus and a fourth other communication apparatus based on the owner of the first other communication apparatus and the owner of the second other communication apparatus;
generate information of the first communication device group to control access to the third other communication apparatus based on the relatedness information; and
provide the information of the first communication device group to the fourth other communication apparatus.

2. The communication apparatus according to claim 1, wherein the instructions, when executed by the at least one processor, further cause the communication apparatus to:
determine whether or not to provide, based on a result of the authentication processing, information of the third other communication apparatus associated with the first other communication apparatus to the fourth other communication apparatus associated with the second other communication apparatus, and
based on a result of the determination, provide information of the third other communication apparatus to the fourth other communication apparatus.

3. The communication apparatus according to claim 1, wherein the instructions, when executed by the at least one processor, further cause the communication apparatus to, by matching first authentication information of the first other communication apparatus with second authentication information of the second other communication apparatus, perform the authentication processing.

4. The communication apparatus according to claim 2, wherein the information of the third other communication apparatus includes a communication parameter.

5. The communication apparatus according to claim 1, wherein the instructions, when executed by the at least one processor, further cause the communication apparatus to hold relatedness information for relatedness between a first communication device group including the first other communication apparatus and the third other communication apparatus, and a second communication device group including the second other communication apparatus and the fourth other communication apparatus.

6. The communication apparatus according to claim 5, wherein the instructions, when executed by the at least one processor, further cause the communication apparatus to, based on the relatedness information, control a range of communication apparatuses for which to permit the provision of the information.

7. The communication apparatus according to claim 1, wherein the instructions, when executed by the at least one processor, further cause the communication apparatus to, in a case where the provision of the information is completed, notify at least one out of the first other communication apparatus, the second other communication apparatus, the third other communication apparatus, or the fourth other communication apparatus of the completion of the provision of the information.

8. The communication apparatus according to claim 7, wherein the instructions, when executed by the at least one processor, further cause the communication apparatus to, in a case where the provision of the information fails, notify at least one out of the first other communication apparatus, the second other communication apparatus, the third other communication apparatus, or the fourth other communication apparatus of the failure of the provision of the information.

9. A communication system including a communication apparatus, a first other communication apparatus, and a second other communication apparatus, wherein
the communication apparatus comprises:
at least one processor; and
at least one memory storing instructions which, when executed by the at least one processor, cause the communication apparatus to:
obtain authentication information from each of a first other communication apparatus and a second other communication apparatus;
perform authentication processing based on the obtained authentication information;
identify a first owner of the first other communication apparatus and a second owner of the second other communication apparatus;
evaluate relatedness information of a relatedness between a first communication device group including the first other communication apparatus and a third other communication apparatus, and a second communication device group including the second other communication apparatus and a fourth other communication apparatus based on the owner of the first other communication apparatus and the owner of the second other communication apparatus;

generate information of the first communication device group to control access to the third other communication apparatus based on the relatedness information; and provide the information of the first communication device group to the fourth other communication apparatus.

10. A method of controlling a communication apparatus, the method comprising:

obtaining authentication information from each of a first other communication apparatus and a second other communication apparatus;

performing authentication processing based on the obtained authentication information;

identifying a first owner of the first other communication apparatus and a second owner of the second other communication apparatus;

evaluating relatedness information of a relatedness between a first communication device group including the first other communication apparatus and a third other communication apparatus, and a second communication device group including the second other communication apparatus and a fourth other communication apparatus based on the owner of the first other communication apparatus and the owner of the second other communication apparatus;

generating information of the first communication device group to control access to the third other communication apparatus based on the relatedness information; and providing the information of the first communication device group to the fourth other communication apparatus.

11. A non-transitory computer-readable storage medium storing a computer program for causing a computer to execute a method of controlling a communication apparatus, the method comprising:

obtaining authentication information from each of a first other communication apparatus and a second other communication apparatus;

performing authentication processing based on the obtained authentication information;

identifying a first owner of the first other communication apparatus and a second owner of the second other communication apparatus;

evaluating relatedness information of a relatedness between a first communication device group including the first other communication apparatus and a third other communication apparatus, and a second communication device group including the second other communication apparatus and a fourth other communication apparatus based on the owner of the first other communication apparatus and the owner of the second other communication apparatus;

generating information of the first communication device group to control access to the third other communication apparatus based on the relatedness information; and providing the information of the first communication device group to the fourth other communication device group.

12. The communication apparatus according to claim 1, wherein the instructions, when executed by the at least one processor, further cause the communication apparatus to perform the authentication processing by determining whether the first other communication apparatus or the second other communication apparatus is included in a rejection list.

13. The communication apparatus according to claim 1, wherein the information of the first communication device group provided to the fourth other communication apparatus includes information of all devices in the first communication device group.

14. The communication apparatus according to claim 1, wherein the information of the first communication device group provided to the fourth other communication apparatus includes information of a portion of the devices in the first communication device group.

15. The communication apparatus according to claim 1, wherein the instructions, when executed by the at least one processor, further cause the communication apparatus to permit the fourth other communication apparatus to communicate with the third other communication apparatus based on the relatedness information.

16. The communication apparatus according to claim 1, wherein the owner of the first other communication apparatus and the owner of the second other communication apparatus is one or more of a user, an organization, or a group of devices.

17. The communication apparatus according to claim 1, wherein the relatedness information indicates a type of relatedness that allows access to all devices in a communication device group.

18. The communication apparatus according to claim 1, wherein the relatedness information indicates a type of relatedness that allows access to a portion of devices in a communication device group.

19. The communication apparatus according to claim 1, wherein the relatedness information is stored in a server separate from the communication apparatus and is obtained by the communication apparatus prior to evaluation of the relatedness information.

* * * * *